US007551166B2

(12) United States Patent
Endo

(10) Patent No.: US 7,551,166 B2
(45) Date of Patent: Jun. 23, 2009

(54) DISPLAY DEVICE, METHOD FOR DRIVING THE SAME, AND ELECTRONIC DEVICE USING THE SAME

(75) Inventor: Masami Endo, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 729 days.

(21) Appl. No.: 10/844,522

(22) Filed: May 13, 2004

(65) Prior Publication Data

US 2004/0227764 A1 Nov. 18, 2004

(30) Foreign Application Priority Data

May 16, 2003 (JP) ............................ 2003-139667

(51) Int. Cl.
*G06F 3/038* (2006.01)

(52) U.S. Cl. .......................... 345/204; 345/98; 345/99; 345/100

(58) Field of Classification Search ........... 345/87–100, 345/204, 55, 76, 213, 534, 535, 539
See application file for complete search history.

(56) References Cited

U.S. PATENT DOCUMENTS 5,572,691 A 11/1996 Koudmani
5,960,072 A * 9/1999 Hird et al. .................. 379/132
6,072,451 A * 6/2000 Mano et al. .................. 345/89
6,529,176 B1 * 3/2003 Okumura et al. .............. 345/13
6,943,782 B2 * 9/2005 Tamura ...................... 345/204
7,138,975 B2 11/2006 Koyama
7,199,834 B2 * 4/2007 Fujii et al. .................. 348/521
7,330,179 B2 * 2/2008 Endo et al. .................. 345/204
2003/0174153 A1 * 9/2003 Koyama ...................... 345/690

OTHER PUBLICATIONS

Office Action (Application No. 200410043553.1) dated Aug. 31, 2007.

* cited by examiner

*Primary Examiner*—Sumati Lefkowitz
*Assistant Examiner*—Seokyun Moon
(74) *Attorney, Agent, or Firm*—Eric J. Robinson; Robinson Intellectual Property Law Office, P.C.

(57) ABSTRACT

An object of the present invention is to provide a display device in which a frame frequency does not decrease even in the case of employing a method for driving having little difference between reading time of a memory and writing time of a memory. According to the present invention, a reading device and a writing device are synchronized by determining allotment of two memories every cycle of a writing signal and by determining a start of reading through a start signal for writing and horizontal synchronizing signals.

10 Claims, 14 Drawing Sheets

FIG. 10A
PRIOR ART
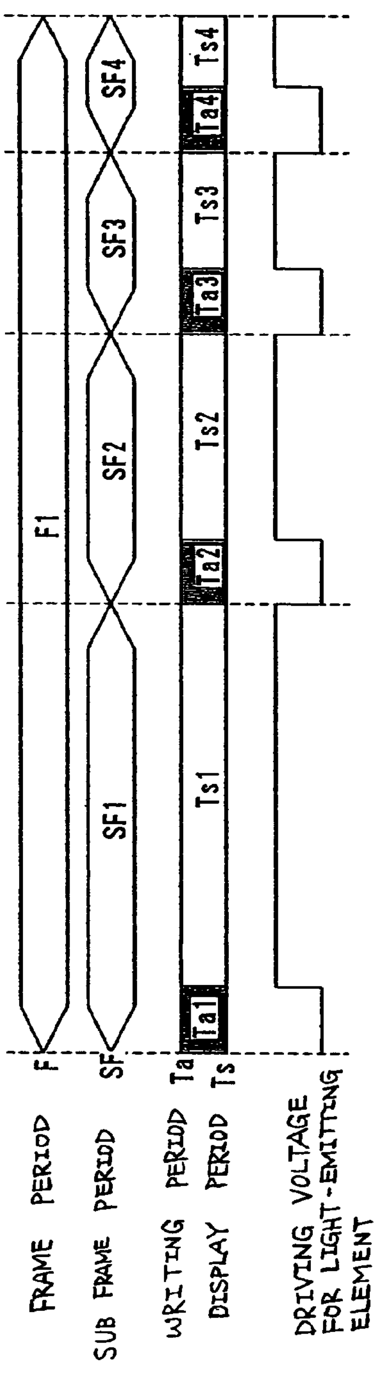
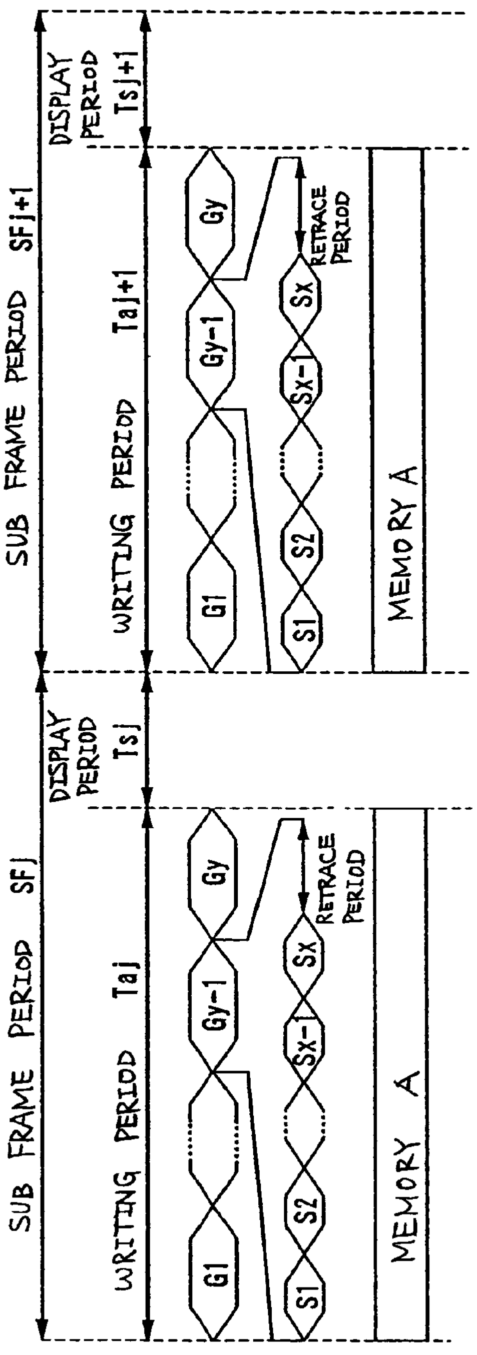
FIG. 10B
PRIOR ART

DISPLAY DEVICE, METHOD FOR DRIVING THE SAME, AND ELECTRONIC DEVICE USING THE SAME

BACKGROUND OF THE INVENTION

1. Field of the Invention

The present invention relates to a display device and a method for driving the display device, and more specifically a display device using a light-emitting element and having a memory control circuit. The memory control circuit controls writing into and reading from a memory such as a SRAM (Static Random Access Memory).

2. Related Art

A display device where a light-emitting element is disposed in each pixel and which displays an image by controlling emission of the light-emitting element is described hereinafter.

In this specification, the light-emitting element means an element (EL element) having a structure in which an organic compound layer that emits light when an electric field is generated is sandwiched between an anode and a cathode, but the light-emitting element is not limited thereto.

Further, in this specification, the light-emitting element means both an element that utilizes light emitted when making a transition from a singlet exciton to a ground state (fluorescence) and an element that utilizes light emitted when making a transition from a triplet exciton to a ground state (phosphorescence).

An organic compound layer includes a hole injection layer, a hole transport layer, a light-emitting layer, an electron transport layer, an electron injection layer, or the like. The light-emitting element is given as a laminated structure of an anode, a light-emitting layer, and a cathode in this order. The basic structure can be modified into a laminate of an anode, a hole injection layer, a light-emitting layer, an electron injection layer, and a cathode in this order, or a laminate of an anode, a hole injection layer, a hole transport layer, a light-emitting layer, an electron transport layer, an electron injection layer, and a cathode in this order.

A display device comprises a display and a peripheral circuit for inputting signals to the display.

A structure of the display is shown in a block diagram of FIG. 8.

In FIG. 8, a display 2000 comprises a source signal driver circuit 2107 comprising a shift register 2110, a LAT A 2111 and a LAT B 2112, a gate signal driver circuit 2108 and a pixel portion 2109. A display controller 2002 which inputs data into the source signal driver circuit 2107 and the gate signal driver circuit 2108 is provided. The pixel portion has pixels disposed in a matrix configuration. In addition, a signal control circuit 2001 comprises a memory controller 2003, a CPU 2004, memories A 2005 and B 2006.

Thin film transistors (hereinafter, referred to as TFTs) are arranged in each pixel. Here, a method for arranging two TFTs in each pixel and controlling light emitted from the light-emitting element of each pixel is described.

FIG. 9 shows a structure of a pixel portion of a display device.

Source signal lines S1 to Sx, gate signal lines G1 to Gy, and electric power source supply lines V1 to Vx are arranged in a pixel portion 2700, and x columns and y rows (where x and y are natural numbers) of pixels are also arranged in the pixel portion. Each pixel 2705 has a switching TFT 2701, a driver TFT 2702, a storage capacitor 2703, and a light-emitting element 2704.

The pixel comprises one source signal line S of the source signal lines S1 to Sx, one gate signal line G of the gate signal lines G1 to Gy, one electric power source supply line V of the electric power source supply lines V1 to Vx, the switching TFT 2701, the driver TFT 2702, the storage capacitor 2703, and the light-emitting element 2704.

A gate electrode of the switching TFT 2701 is connected to the gate signal line G, and either a source region or a drain region of the switching TFT 2701 is connected to the source signal line S, while the other is connected to a gate electrode of the driver TFT 2702 or to one electrode of the storage capacitor 2703. Either a source region or a drain region of the driver TFT 2702 is connected to the electric power source supply line V, while the other is connected to an anode or a cathode of the light-emitting element 2704. One of two electrodes of the storage capacitor 2703, namely an electrode that is not connected to the driver TFT 2702 and the switching TFT 2701, is connected to the electric power source supply line V.

In this specification, the anode of the light-emitting element 2704 is referred to as a pixel electrode, and the cathode of the light-emitting element 2704 is referred to as an opposing electrode in the case where the source region or the drain region of the driver TFT 2702 is connected to the anode of the light-emitting element 2704. On the other hand, the cathode of the light-emitting element 2704 is referred to as a pixel electrode, and the anode of the light-emitting element 2704 is referred to as an opposing electrode in the case where the source region or the drain region of the driver TFT 2702 is connected to the cathode of the light-emitting element 2704.

Further, an electric potential imparted to the electric power source supply line V is referred to as an electric power source electric potential, and an electric potential imparted to the opposing electrode is referred to as an opposing electric potential.

The switching TFT 2701 and the driver TFT 2702 may be either p-channel TFTs or n-channel TFTs. However, it is preferable that the driver TFT 2702 is a p-channel TFT and the switching TFT 2701 is an n-channel TFT in the case where the pixel electrode of the light-emitting element 2704 is the anode. Meanwhile, it is preferable that the driver TFT 2702 is an n-channel TFT and the switching TFT 2701 is a p-channel TFT in the case where the pixel electrode is the cathode.

Operations in displaying an image in the aforementioned pixel structure are described hereinafter.

Signals are input to the gate signal line G, and an electric potential of the gate electrode of the switching TFT 2701 changes, and then a gate voltage changes. In this way, the signals are input to the gate electrode of the driver TFT 2702 from the source signal line S through a source and a drain of the switching TFT 2701 that is made conductive. Further, the signals are stored in the storage capacitor 2703. The gate voltage of the driver TFT 2702 changes in accordance with the signals input to the gate electrode of the driver TFT 2702, and then the source and the drain are electrically connected. The electric potential of the electric power source supply line V is imparted to the pixel electrode of the light-emitting element 2704 through the driver TFT 2702. The light-emitting element 2704 thus emits light.

A method for expressing gray scale with pixels having such a structure is described. Methods for expressing gray scale can be roughly divided into an analog method and a digital method. The digital method has advantage of being resistant to fluctuation on TFTs as compared with the analog method. A digital gray scale expression method is focused upon here. A time gray scale method can be given as the digital gray scale expression method. The time gray scale driving method is described in detail hereinafter.

The time gray scale driving method is a method for expressing gray scale by controlling a period during which each pixel of a display device emits light. When a period for displaying one image is taken as one frame period, one frame period is divided into a plurality of sub frame periods.

Lighting or non-lighting, namely whether the light-emitting element of each pixel is made to emit light or not to emit light every sub frame period, controls the period during which the light-emitting element emits light in one frame period, and gray scale of each pixel is expressed.

The method for driving the time gray scale method is described in detail with reference to timing charts of FIGS. 10A and 10B. Note that FIGS. 10A and 10B show an example of expressing gray scale using 4-bit digital image signals. Note also that FIG. 9 may be referred to regarding the structure of the pixels. Here, in accordance with an external electric power source (not shown), the opposing electric potential can be switched to have an electric potential on the order of the electric potential of the electric power source supply lines V1 to Vx (electric power source electric potential) or to have enough electric potential difference to make the light-emitting element 2704 emit light between the opposing electric potential and the electric power source supply lines V1 to Vx.

One frame period F is divided into a plurality of sub frame periods SF1 to SF4. The gate signal line G1 is selected first in the first sub frame period SF1, and digital image signals are input from the source signal lines S1 to Sx to each of the pixels having the switching TFTs 2701 with the gate electrode connected to the gate signal line G1. The driver TFT 2702 of each pixel is to be in an ON state or an OFF state by the input digital image signals.

The term "ON state" for a TFT in this specification indicates that the source and the drain are in a conductive state in accordance with the gate voltage. Further, the term "OFF state" for a TFT indicates that the source and the drain are in a non-conductive state in accordance with the gate voltage.

At this point, the opposing electric potential of the light-emitting element 2704 is set nearly equal to the electric potential of the electric power source supply lines V1 to Vx (electric power source electric potential); therefore, the light-emitting element 2704 does not emit light even in a pixel where the driver TFT 2702 is in an ON state. The aforementioned operations are repeated for all of the gate signal lines G1 to Gy, and a writing period Tal is completed. Note that a writing period of the first sub frame period SF1 is referred to as Tal. In general, a writing period of the j-th sub frame period (where j is a natural number) is referred to as Taj.

The opposing electric potential changes to have enough electric potential difference to make the light-emitting element 2704 emit light with the electric power source electric potential, when the writing period Tal is completed. A display period Ts1 thus begins. Note that a display period of the first sub frame period SF1 is referred to as Ts1. In general, a display period of the j-th sub frame period (where j is a natural number) is referred to as Tsj. The light-emitting element 2704 of each pixel is to be in a light-emitting state or a non-light-emitting state according to the input signals during the display period Ts1.

The aforementioned operations are repeated for all of the sub frame periods SF1 to SF4, and then one frame period Fl is completed. Here, lengths of the display periods Ts1 to Ts4 in the sub frame periods SF1 to SF4 are set appropriately, and gray scale is expressed by an accumulating total of the display periods in the sub frame period during which the light-emitting element 2704 emit light in one frame period F. In other words, gray scale is expressed with a total amount of lighting time within one frame period.

A method for generally expressing $2^n$ gray scale by inputting n-bit digital video signals is described. At this point, one frame period is divided into n sub frame periods SF1 to SFn, for example, and the ratio of lengths of the display periods Ts1 to Tsn in the sub frame periods SF1 to SFn are set so as to be Ts1: Ts2: . . . : Tsn-1: Tsn=$2^0$:$2^{-1}$: . . . :$2^{-n+2}$: $2^{-n+1}$. Note that the lengths of the writing periods Tal to Tan are all the same.

Gray scale of a pixel in one frame period is determined by figuring out a total of the display period Ts during which a light-emitting state is selected of the light-emitting element 2704 for the duration of the one frame period. For example, when brightness in the case where a pixel emits light over a whole display period is taken to be one hundred percent at the time of n=8, one percent of brightness can be expressed when the pixel emits light in Ts7 and Ts8. Sixty percent of brightness can be expressed in the case of selecting Ts 6, Ts 4, and Ts 1.

A circuit for converting signals into signals for time gray scale is required in order to display with such a time gray scale method described above. FIG. 2 shows a schematic diagram of a conventional control circuit. A control circuit 200 comprises memories A 201 and B 202 for storing data, a logic circuit for reading data and writing the data into the memory (W-LOGIC 203), and a logic circuit for reading the date from the memory and outputting the data to a display 205 (R-LOGIC 204).

FIG. 3 shows a timing chart of the conventional control circuit. Data is written and read alternately using the memories A 201 and B 202 in order to allow digital data that is input to the W-LOGIC 203 to be adapted to the time gray scale method.

When the R-LOGIC 204 reads signals stored in the memory A 201, digital video signals that can be used for the next frame period are simultaneously input to the memory B 202 through the W-LOGIC 203 and starts to be stored.

Thus, the control circuit 200 has the memories A 201 and B 202 that can store digital video signals of 1 frame period each, and samples the digital video signals by using the memories A 201 and B 202 alternately.

Conventionally, the control circuit is put in a stand-by state (Wait) until the next reading signal is given after writing into the memory A 201 or B 202. Further, roles of the memories A201 and B202 is switched from/to writing to/from reading in timing with reading which takes more time. (FIG. 3)

In a conventional method, a reading time is set much longer than a writing time. Therefore, there is no problem with a method in which writing is performed as needed and operating functions are switched after reading is completed.

However, there is a problem with a driving method that has little difference between reading time of a memory and writing time of a memory. The timing of writing into a memory is delayed according to the conventional method in which there is a Wait state until reading is performed after writing. As a result, the conventional method has a problem that a frame frequency decreases.

SUMMARY OF THE INVENTION

In order to solve the above problems of the related art, following steps are taken in the present invention. Namely, allotment of two memories is determined every cycle of writing signals, and a start of reading is determined through start signals for writing and horizontal synchronizing signals.

The problems can be solved with a display device having a light-emitting element and expressing gray scale with a length of lighting time, comprising: a control circuit comprising: first to fourth signals; first and second memories; a reading device; and a writing device, wherein the first signal is a vertical synchronizing signal; the second signal is a horizontal synchronizing signal; the third signal selects roles of the first and the second memories from writing and reading according to timing provided from the first signal and switches the roles of the first and the second memories every start of a writing signal; the fourth signal is determined according to states of the writing signal and the second horizontal synchronizing signal; the fourth signal is in a readable state in the case where the writing signal is in a writable state and the second horizontal synchronizing signal is in a stand-by state for reading; the fourth signal is in a stand-by state for reading in the case where the writing signal is in a writable state and the second horizontal synchronizing signal is in a stand-by state for reading; and the reading device and the writing device are synchronized according to a series of states above.

Further, the reading device and the writing device may not only be FPGAs but also LSIs. Furthermore, they may be constituted over the same substrate with the display device.

Consequently, even when there is little difference between reading time of a memory and writing time of a memory, operating functions can be switched in the optimum period. The problem that the frame frequency decreases can thus be solved.

These and other objects, features and advantages of the present invention will become more apparent upon reading of the following detailed description along with the accompanied drawings.

BRIEF DESCRIPTION OF THE DRAWINGS

In the accompanying drawings:

FIGS. 10A and 10B are timing charts of operations of a conventional example;

DETAILED DESCRIPTION OF THE INVENTION

This application is based on Japanese Patent Application serial no. 2003-139667 filed in Japan Patent Office on May 16 in 2003, the contents of which are hereby incorporated by reference.

Embodiment Mode

Figure 1:
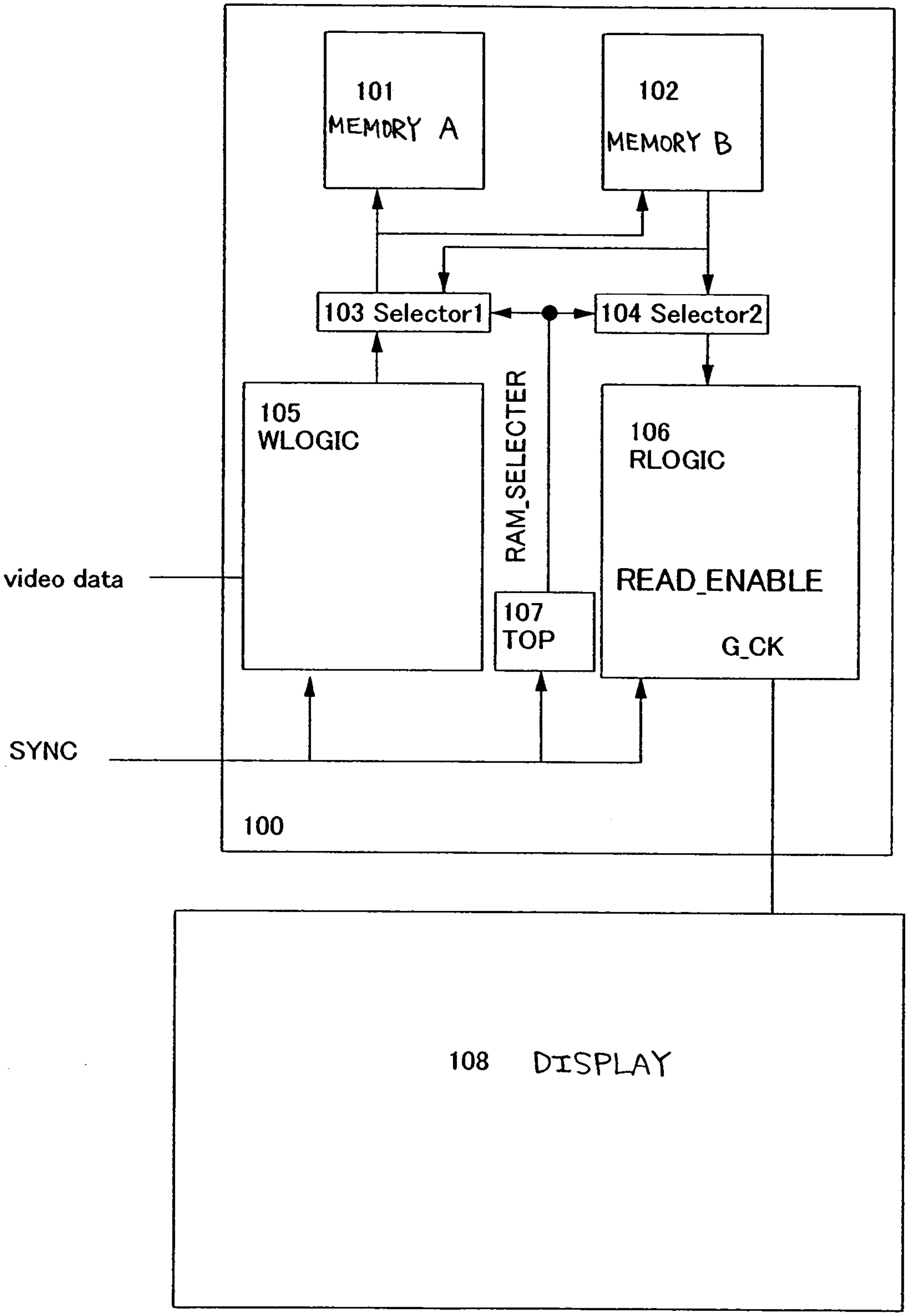
FIG. 1 is a block diagram of the present invention.
Figure 2:
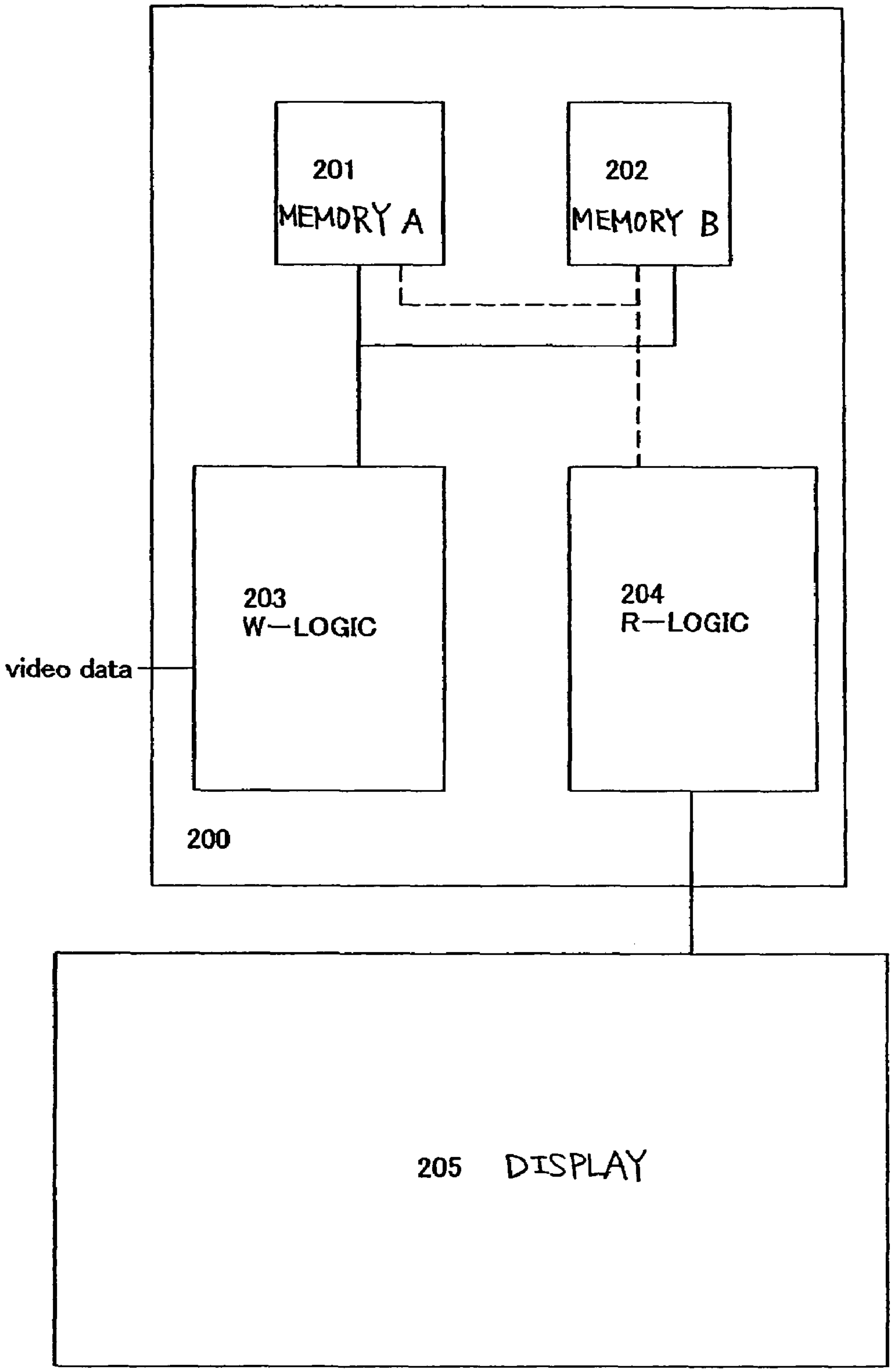
FIG. 2 PRIOR ART
FIG. 2 is a block diagram of a conventional example.
Figure 3:
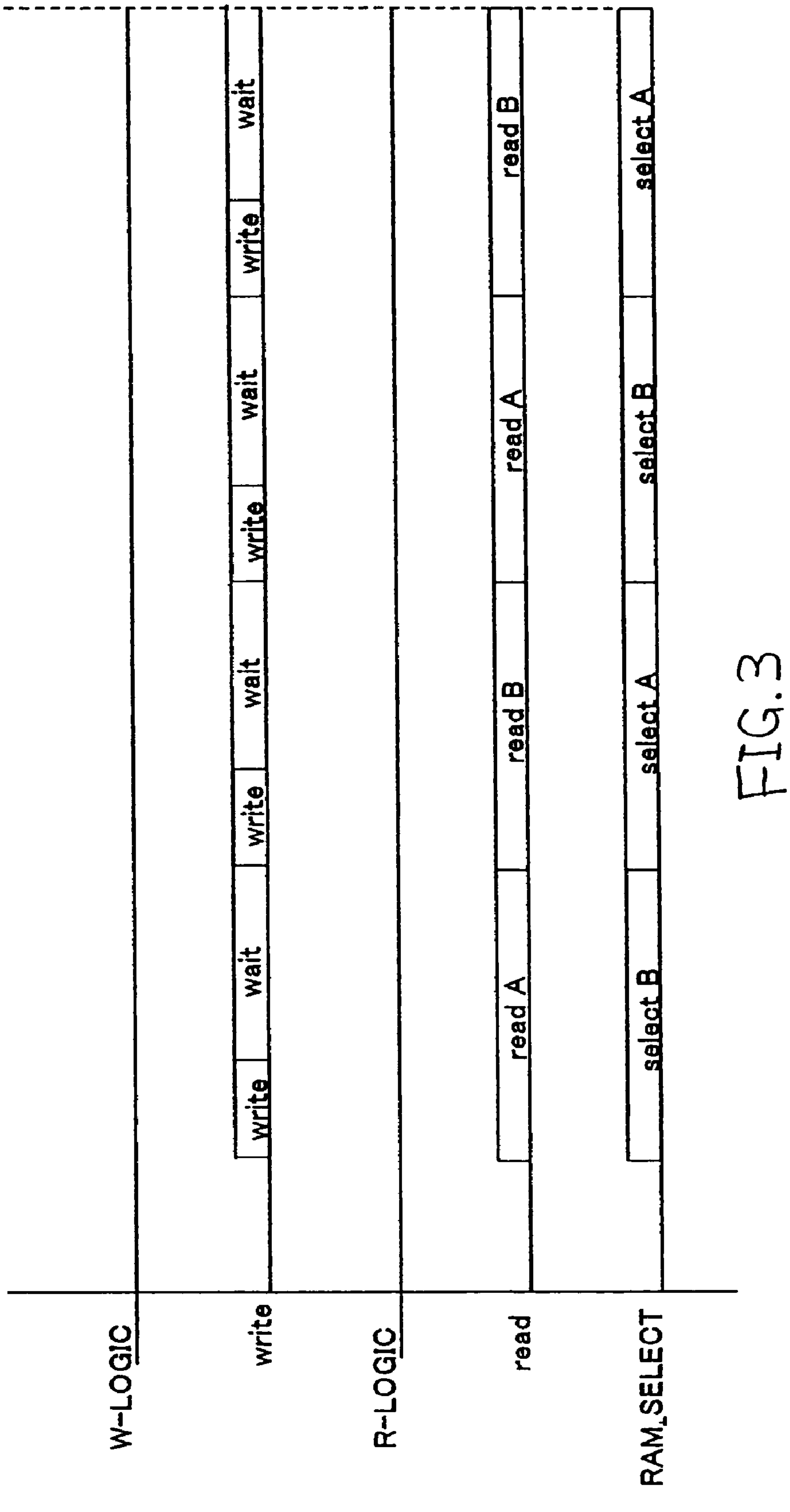
FIG. 3 PRIOR ART
FIG. 3 is a timing chart of operations of a conventional example.

FIG. 1 is a block diagram showing a typical structure of the present invention.

A control circuit 100 comprises memories A 101 and B 102, Selectors 103 and 104 for selecting a function of writing or reading for the memory, a logic circuit for writing into the memory (W-LOGIC 105), a logic circuit for reading from the memory and outputting (R-LOGIC 106), and a circuit for determining a starting point of vertical synchronizing signals (SYNC) (TOP 107).

Signals of SYNC, G_CK, RAM_SELECTOR, and READ_ENABLE are newly adopted to achieve synchronization.

RAM_SELECTOR is inverted every time SYNC is input, and roles of the memories A 101 and B 102 are switched from/to writing to/from reading by the Selectors 103 and 104.

Figure 4:
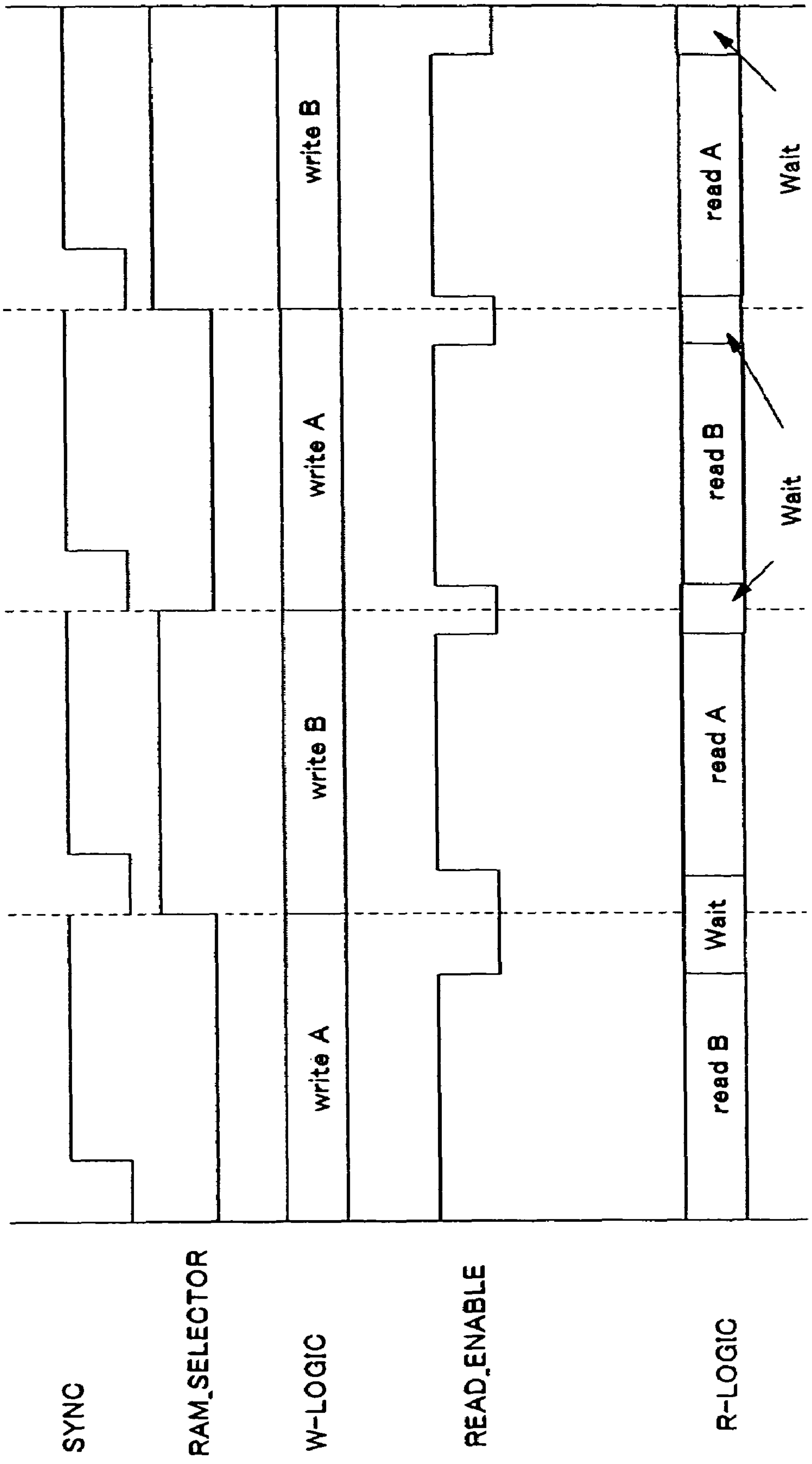
FIG. 4 is a timing chart of operations of the present invention.

FIG. 4 shows a timing chart of operations of the TOP 107, the W-LOGIC 105, and the R-LOGIC 106. RAM_SELECTOR is inverted when SYNC is input, and roles of the two memories A 101 and B 102 are switched from/to writing to/from reading. At the same time, the W-LOGIC performs writing, the R-LOGIC starts to read, and READ_ENABLE becomes High (or Low).

Figure 5:
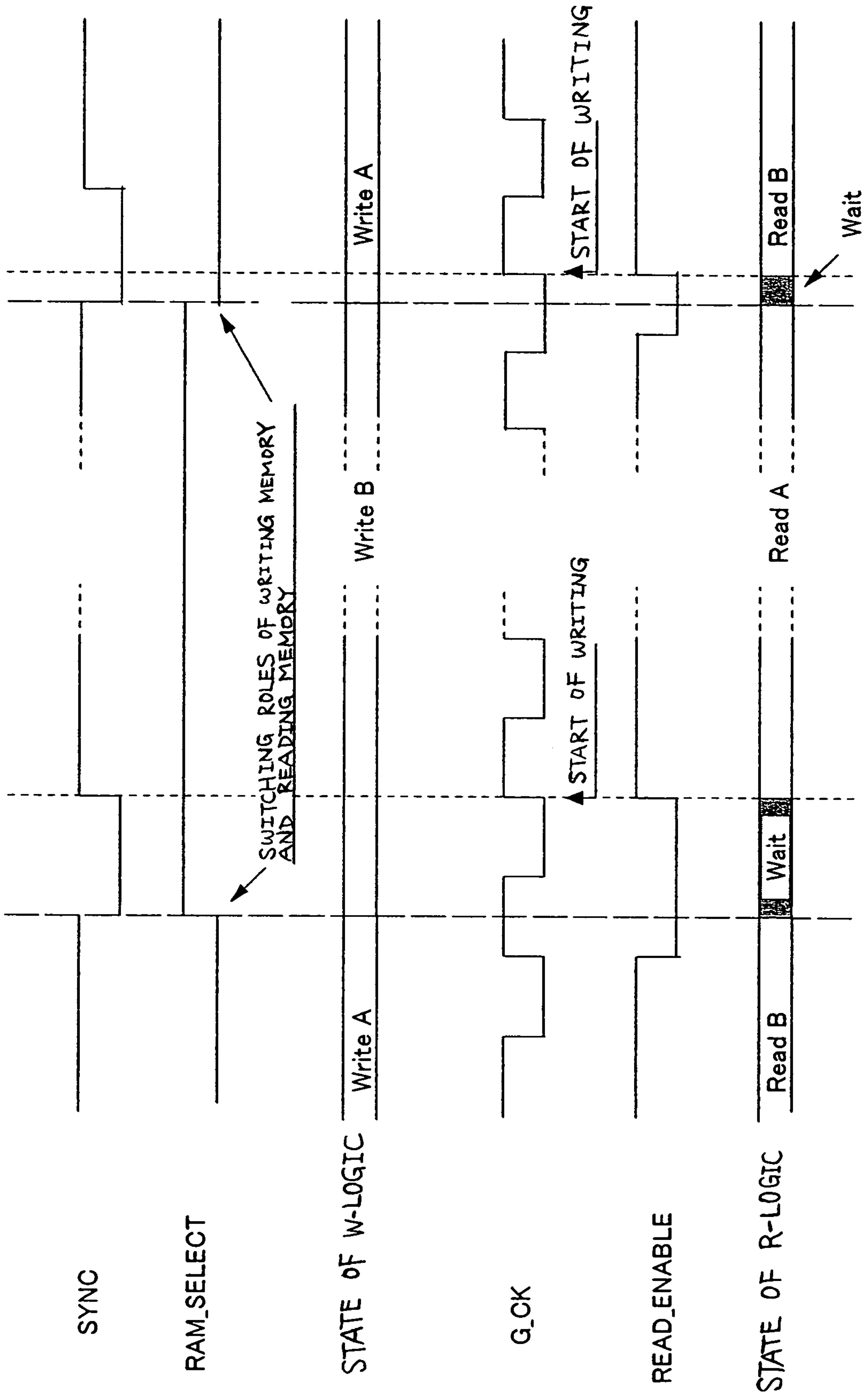
FIG. 5 is a timing chart of operations of the present invention.

FIG. 5 shows a timing chart regarding the synchronization and the timing of reading.

RAM_SELECTOR is inverted by vertical synchronizing signals (SYNC), and roles of the memories are switched from/to writing to/from reading. Therefore, the W-LOGIC alternately uses the memories A101 and B102 shown in FIG. 1 for writing data.

READ_ENABLE is to be signals indicating that the R-LOGIC is in a readable state at the time of High and indicating that the R-LOGIC is in a stand-by state (Wait) at the time of Low.

Further, READ_ENABLE is put in a writable state (High) from a starting point (High) of horizontal synchronizing signals (G_CK) after RAM_SELECTOR is inverted, and the R-LOGIC is put in a readable state from a stand-by state for reading (Wait). Note that the stand-by state for reading (Wait) of the R-LOGIC automatically becomes a stand-by state for reading (Wait) after a reading cycle ends. In other words, RAM_SELECTOR is changed from vertical synchronizing signals, and a period of a stand-by state for reading (Wait) is changed from each state of G_CK and READ_ENABLE. Note that READ_ENABLE indicating a start of horizontal synchronizing signals (G_CK) and a readable state or a stand-by state may be High or Low.

Therefore, different cycles of writing and reading are synchronized by adjusting a period of a stand-by state (Wait) of the R-LOGIC.

Figure 14:
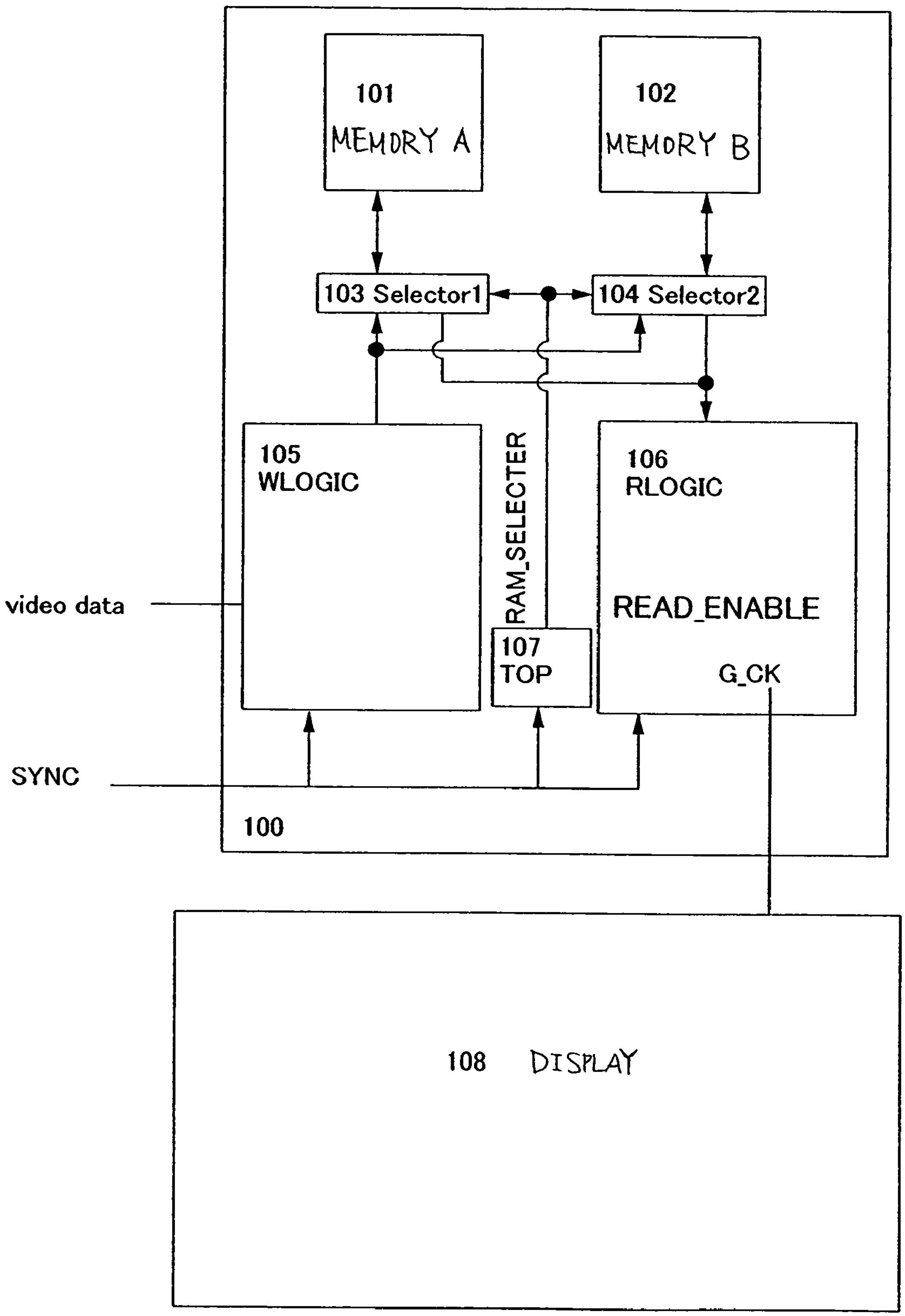
FIG. 14 is a block diagram of the present invention.

In addition, this embodiment mode is not limited to the block diagram of FIG. 1, and a block diagram shown in FIG. 14 can be used.

EMBODIMENTS

Embodiments of the present invention are described.

Embodiment 1

Figure 6:
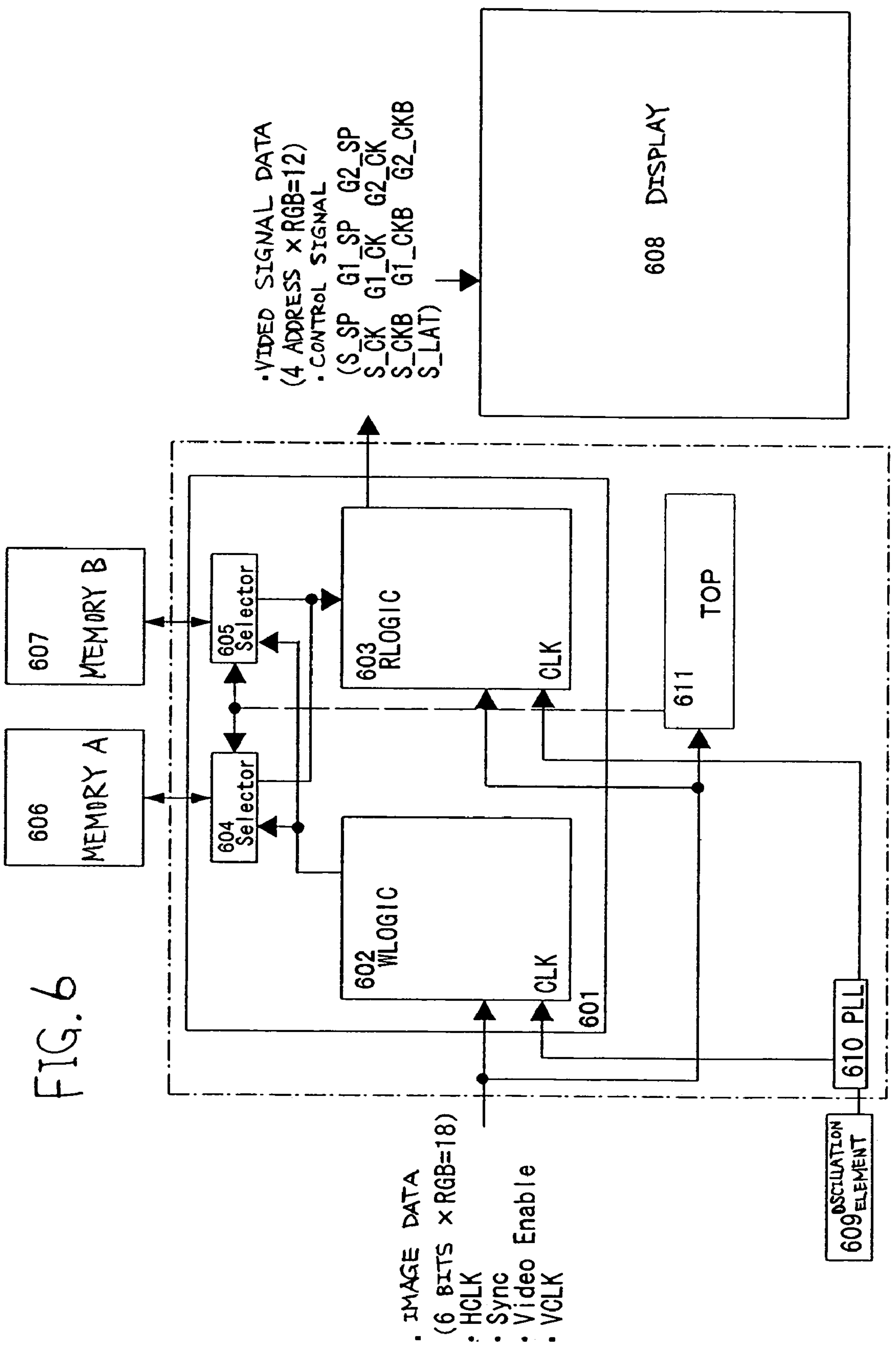
FIG. 6 shows an embodiment according to the present invention.

In this embodiment, an example of a configuration of a control circuit that outputs signals to a display panel using OLED elements is described with reference to FIG. 6.

18-bit (6 bits×RGB) Video_Data and control signals are input to a control circuit 601. Operations from the input of Video_Data to the output to a display 608 are described.

Reading of each row is controlled by VCLK (a cycle is 68.8 μs). First, Video_Data starts to be input by the input of SYNC. After SYNC is input and a certain off period passes, Video_Data starts to be input to a W-LOGIC 602. One row of Video_Data is read per half cycle of VCLK. After 220 rows are input and a certain off period passes, SYNC is input again, and Video_Data is input. An input cycle for full screen is 16.6698 ms (243 cycles of VCLK, 60 cycles per second).

Reading of each block in one row is controlled by HCLK (a cycle is 400 ns). HCLK reads Video_Data during the period in which Video_Enable is High. After data of one row, more specifically data of 176 blocks is read and a certain of f period (Video_Enable is Low) passes, the next row of Video_Data is read. By repeating this operation for 220 rows, data for one screen is completed.

On the other hand, memories A 606 and B 607 are connected to an FPGA 601, and a RAM_SELECT value is inverted every input of SYNC.

RAM_SELECT from the FPGA determines which memory is to be written or read.

Each FPGA comprises 144 (6×8×3) flip-flops. Each flip-flop can store data (6 bits) for one color at a certain point. Data is sequentially output to the next flip-flop by HCLK. When the flip-flop has eight blocks of data, the data is stored in 144 registers and are written to a memory selected by RAM_SELECT.

Because the display 608 displays images by using time gray scale, data written to the memory A 606 or B 607 is rearranged for output to the panel and is sequentially output to the display 608. An R-LOGIC 603 reads data for full screen rearranged for the output to the panel from the memory A 606 or B 607, and then outputs the data to the display 608.

In displaying images on the display 608, Video_Data is processed in 12 bits (4 (address)×RGB (three colors)). GL_CK, G2_CK, G1_CKB, and G2_CKB are clock signals whose cycles are 12 μs each. On either a rising edge or a falling edge of GL_CK and G1_CKB, a row to which the Video_Data is input moves.

Two cycles (24 μs) after G1_SP falls, writing is sequentially performed from a top row in sequence. Writing for 220 rows makes a display for one screen; however, four dummy cycles (48 μs) come before displaying the next image in order to delay writing. In addition, G2_SP rises in erasing the written data as needed.

S_CK and S_CKB are clock signals whose cycles are 200 ns each. On either a rising edge or a falling edge of S_CK and S_CKB, a block to which Video_Data is input moves. Four cycles (800 ns) after G1_CLK rises or falls, S_LAT becomes High to store an electric charge, and when S_SP changes from High to Low, Video_Data starts to be input. As data is input every four address, repeating it 44 times completes writing for one line.

The W-LOGIC 602 and the R-LOGIC 603 are operated by inputting clock signals from an oscillation element 609 through a PLL 610. In addition, the timing of writing and reading to the memories A 606 and B 607 is controlled in accordance with the rising edge and the falling edge of the clock signals through a TOP 611.

A known LSI as well as a FPGA may be used for each of the W-LOGIC 602 and the R-LOGIC 603.

This embodiment is applied to the W-LOGIC 602, the R-LOGIC 603, the TOP 611, the memories A 606 and B 607, and Selectors 604 and 605 that select a memory.

Embodiment 2

Figure 7:
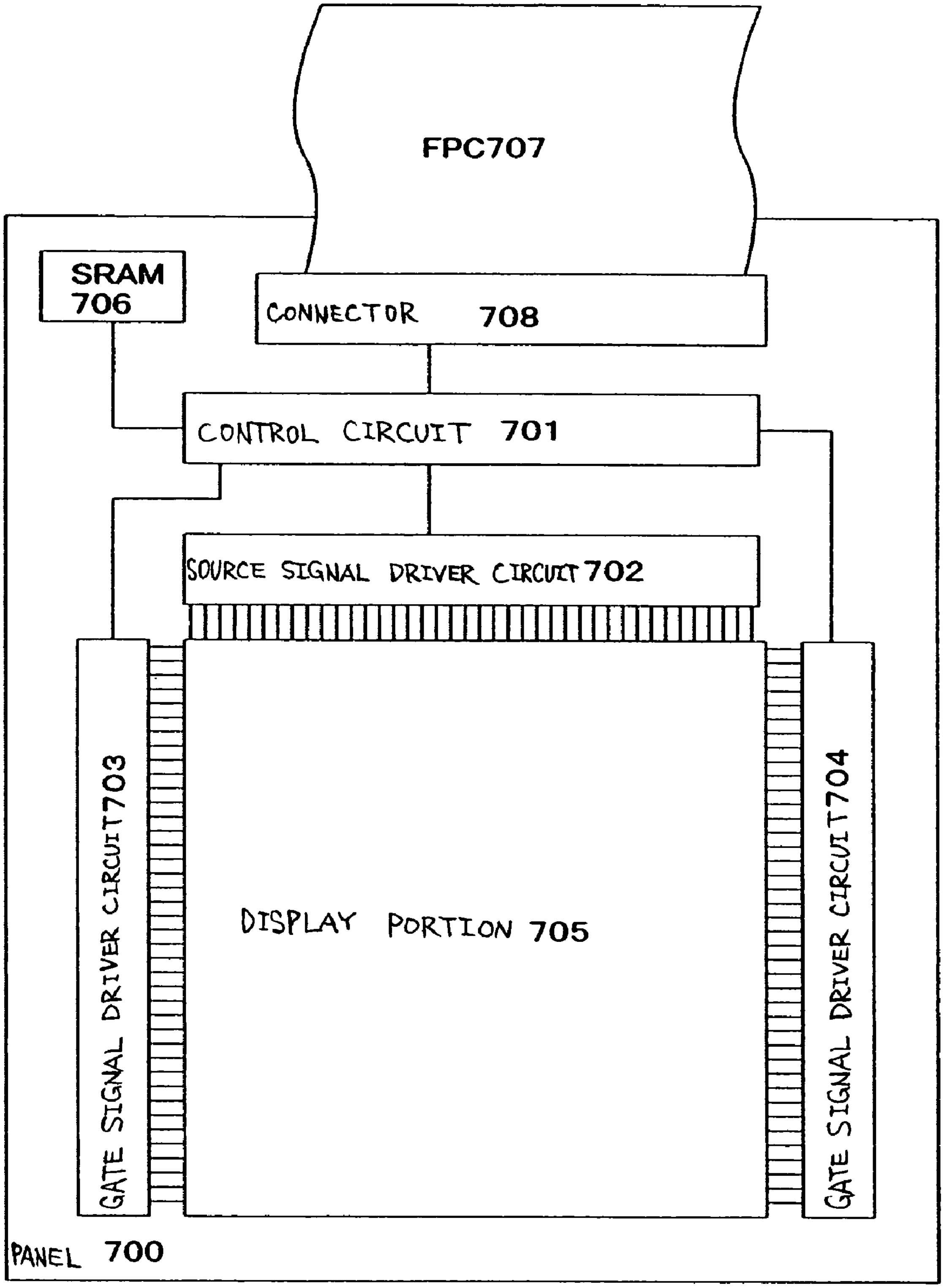
FIG. 7 shows an example of a display device according to the present invention.
Figure 8:
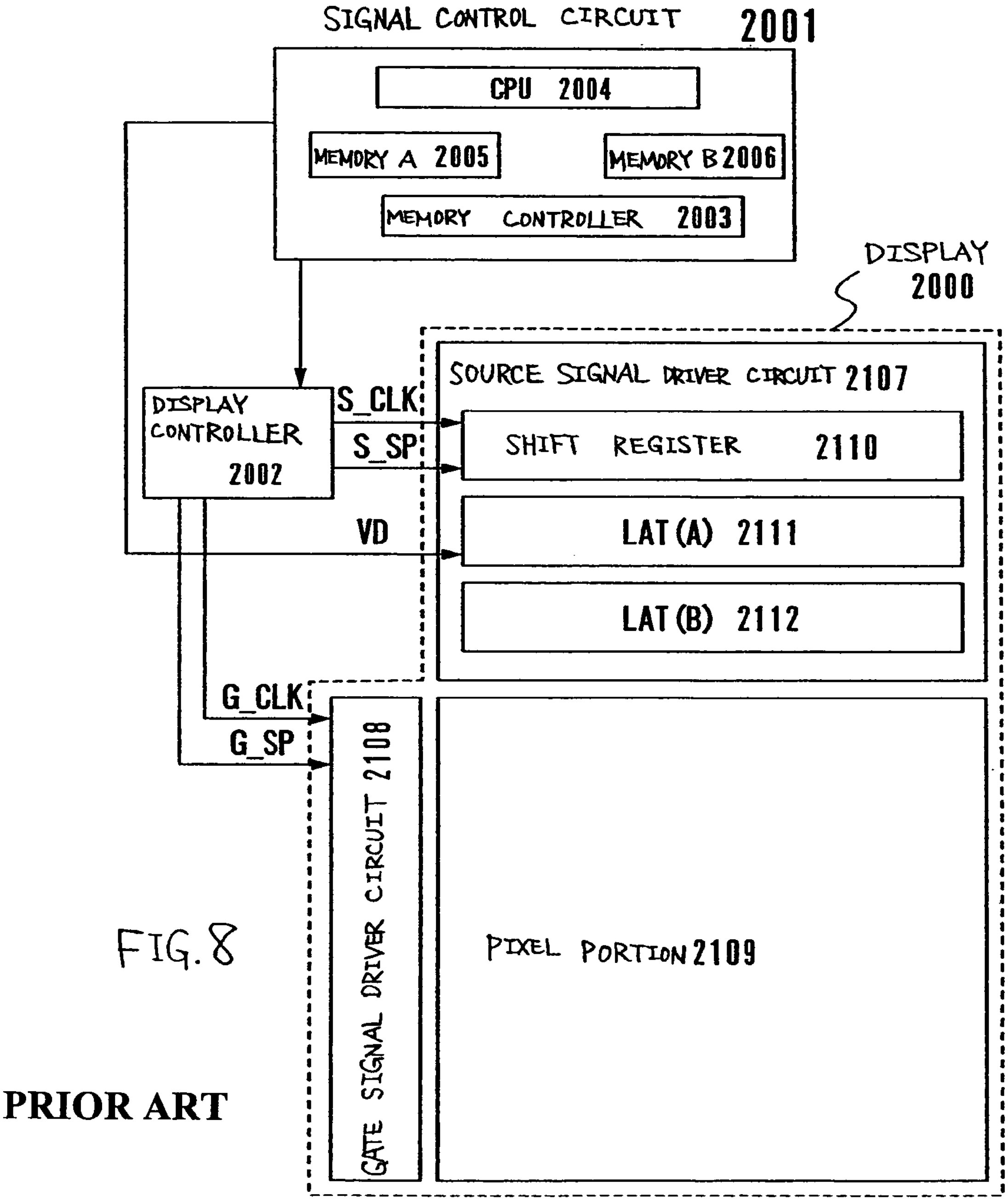
FIG. 8 PRIOR ART
FIG. 8 is a block diagram of a conventional example.
Figure 9:
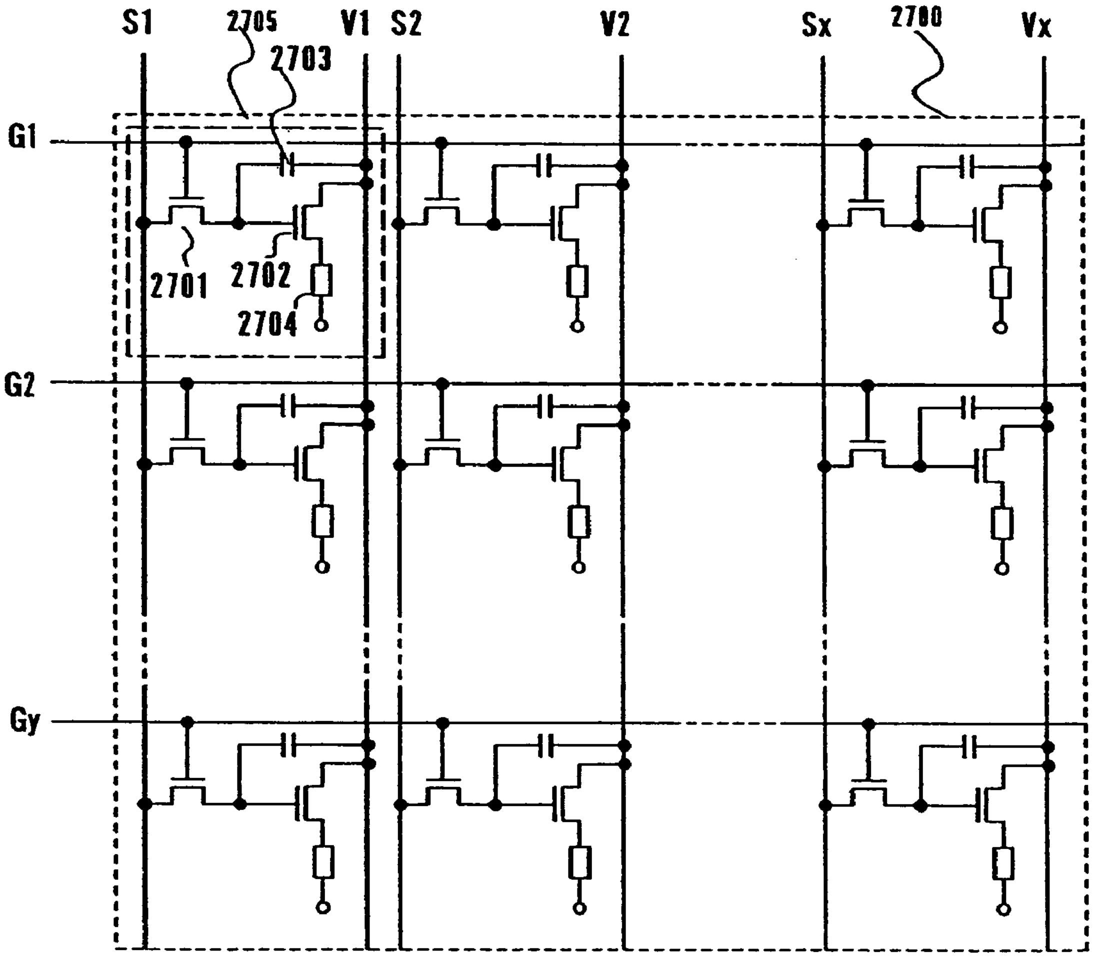
FIG. 9 PRIOR ART
FIG. 9 is a circuit diagram of pixels disposed in a matrix configuration.

FIG. 7 shows an example of a display device using OLED elements with a control circuit of Embodiment 1.

A panel 700 comprises a control circuit 701, a source signal driver circuit 702, a gate signal driver circuits 703 and 704, a display portion 705, a memory 706, a FPC 707, and a connector 708. Each circuit of a display device is formed on the panel 700, or is attached externally.

Operations of the display device are now described. Data and control signals sent from the FPC 707 through the connector 708 are input to the control circuit 701 and the data is rearranged for output in the memory 706, and then is sent to the control circuit 701 again. The control circuit 701 sends data and signals used for displaying to the source signal driver circuit 702 and the gate signal driver circuits 703 and 704, and then an image is displayed at the display portion 705 using OLED elements.

The source signal driver circuit 702 and the gate signal driver circuits 703 and 704 can be substituted for known circuits. Furthermore, the number of the gate signal driver circuits can be reduced to one depending on the circuit configuration.

This embodiment is applied to the control circuit 701.

Embodiment 3

Figure 13:
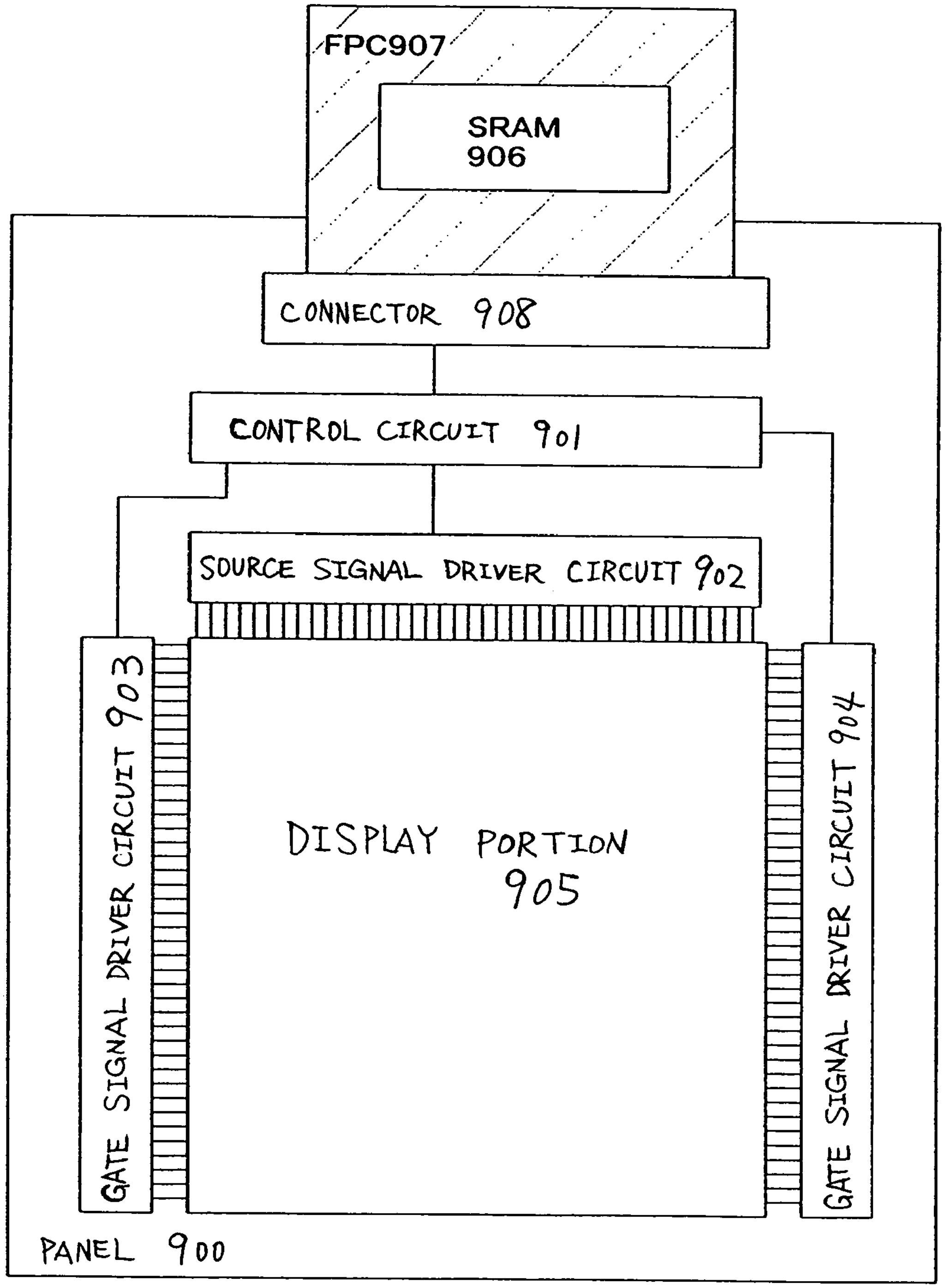
FIG. 13 shows an example of a display device according to the present invention.

In this embodiment, FIG. 13 shows an example of the display device using OLED elements with a control circuit according to Embodiment 1 that is different from Embodiment 2.

A panel 900 comprises a control circuit 901, a source signal driver circuit 902, a gate signal driver circuits 903 and 904, a display portion 905, a memory 906, a FPC 907, and a connector 908. Each circuit of a display device is formed on the panel 900, or is attached externally.

Operations of the display device are now described. Data and control signals sent from the FPC 907 through the connector 908 are input to the control circuit 901 and the data is returned to the memory 906 in the FPC 907, and then is rearranged for the output and sent to the control circuit 901 again. The control circuit 901 sends data and signals used for displaying to the source signal driver circuit 902 and the gate signal driver circuits 903 and 904, and then an image is displayed at the display portion 905 using OLED elements.

A difference with Embodiment 2 is that the memory 906 is incorporated in the FPC 907. Accordingly, the display device can be made smaller.

As with Embodiment 2, the source signal driver circuit 902 and the gate signal driver circuits 903 and 904 can be substituted for known circuits. Furthermore, the number of the gate signal driver circuits can be reduced to one depending on the circuit configuration.

This embodiment is applied to the control circuit 901.

Embodiment 4

In this embodiment, an example of a configuration of a control circuit for outputting to a display using OLED elements having a different configuration from Embodiments 1 to 3 is described with reference to FIG. 11.

Time gray scale display naturally has a higher operating frequency as compared with analog display. In order to achieve high image quality, pseudo-contour needs to be avoided and sub frames needs to be 10 or more. Therefore, the operating frequency also needs to be decupled or more.

In order to drive the device with such an operating frequency, SRAM to be used needs a high-speed operation, and SRAM-IC for a high-speed operation needs to be used.

SRAM for a high-speed operation, however, consumes a large amount of power in storing, so that it is not appropriate for mobile devices. In addition, in order to use a low-power-consumption SRAM, a frequency needs to decrease more.

Figure 11:
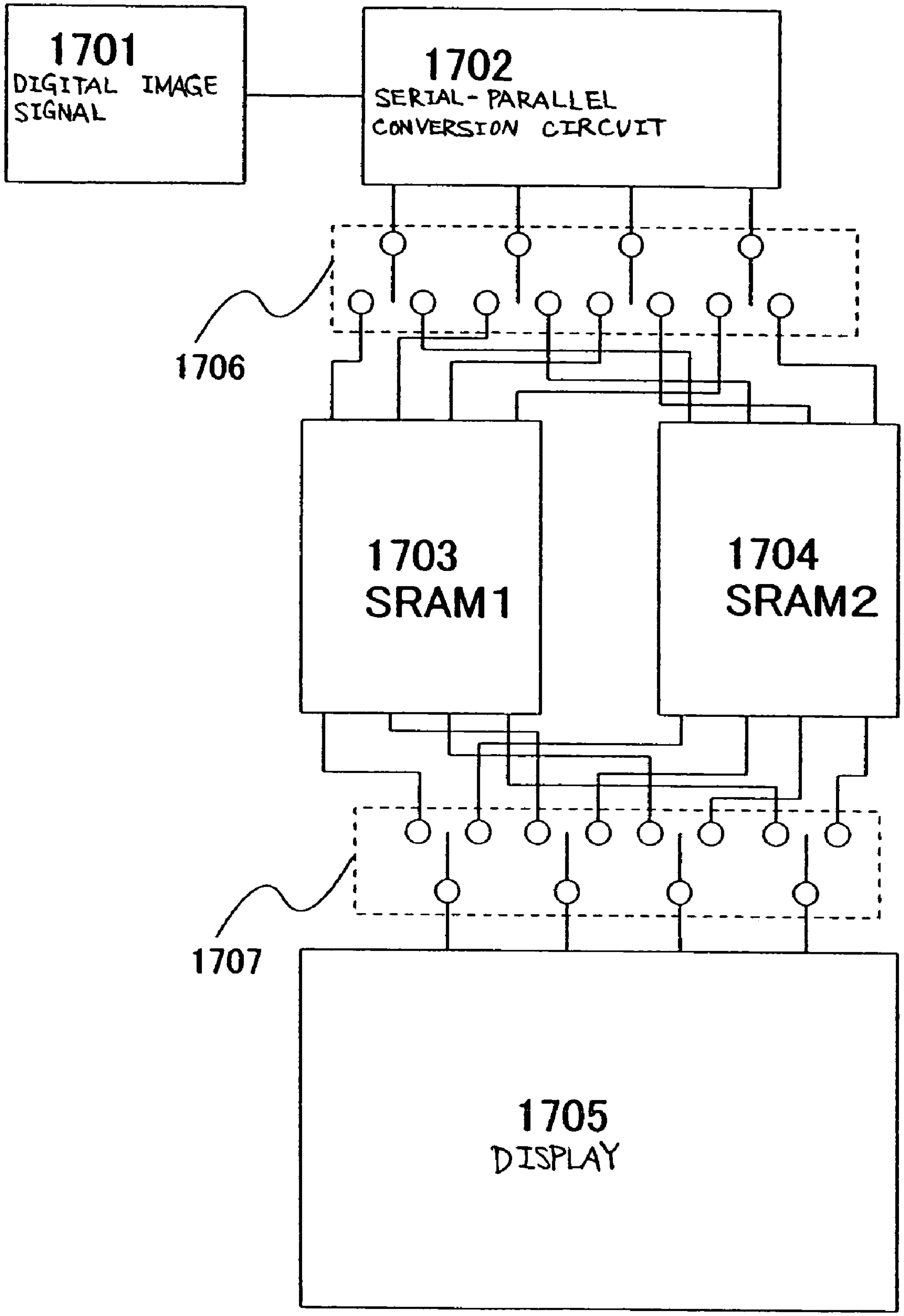
FIG. 11 shows an example of a display device according to the present invention.

As shown in FIG. 11, digital image signals 1701 are changed from serial to parallel by using a serial-parallel conversion circuit 1702 before writing the digital image signals to SRAMs 1703 and 1704. Thereafter, writing is performed to a display 1705 through switches 1706 and 1707. By taking such a countermeasure, parallel calling can be made with a low frequency. Hence, a low-power-consumption SRAM can be used with a low frequency to achieve low power consumption of mobile devices.

Embodiment 5

Examples of electric appliances employing the present invention are as follows: a video camera; a digital camera; a goggle type display (head mounted display); a navigation system; an audio reproducing device (car audio, an audio component, or the like); a laptop computer; a game machine; a portable information terminal (a mobile computer, a cellular phone, a portable game machine, an electronic book, or the like); and an image reproducing device including a recording medium (specifically, an apparatus capable of processing data in a recording medium such as a Digital Versatile Disk (DVD) and having a display that can display the image of the data). Practical examples of these electric appliances are shown in FIGS. 12A to 12G.

Figure 12A:
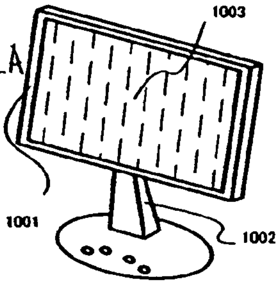
FIGS. 12A to 12G show electric devices according to the present invention.

FIG. 12A shows a liquid crystal display or an OLED display, which comprises a case 1001, a supporting section 1002, a display portion 1003, and the like. The present invention can be applied to a driver circuit of a display device having the display portion 1003.

Figure 12B:
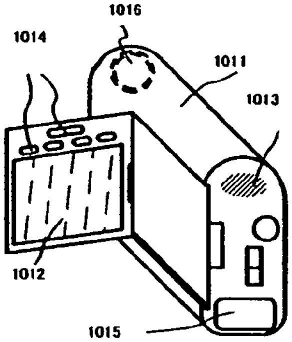

FIG. 12B shows a video camera, which comprises a main body 1011, a display portion 1012, an audio input unit 1013, operation switches 1014, a battery 1015, an image receiving unit 1016, and the like. The present invention can be applied to a driver circuit of a display device having the display portion 1017.

Figure 12C:
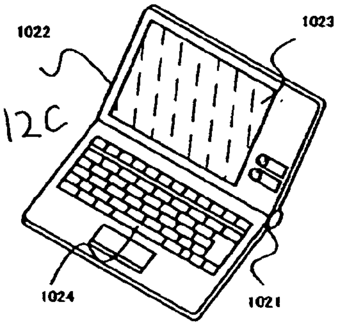

FIG. 12C shows a laptop personal computer, which comprises a main body 1021, a case 1022, a display portion 1023, a keyboard 1024, and the like. The present invention can be applied to a driver circuit of a display device having the display portion 1023.

Figure 12D:
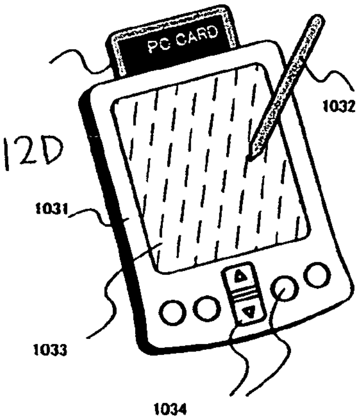

FIG. 12D shows a portable information terminal, which comprises a main body 1031, a stylus 1032, a display portion 1033, operation buttons 1034, an external interface 1035, and the like. The present invention can be applied to a driver circuit of a display device having the display portion 1032.

Figure 12E:
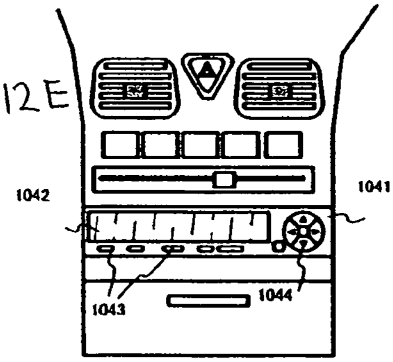

FIG. 12E shows an audio reproducing device, specifically an audio device mounted in a motor vehicle, which comprises a main body 1041, a display portion 1042, operation switches 1043 and 1044, and the like. The present invention can be applied to a driver circuit of a display device having the display portion 1042. Further, the audio device mounted in a motor vehicle is given as an example here; however, the present invention may be applied to a portable audio device or an audio device for home use.

Figure 12F:
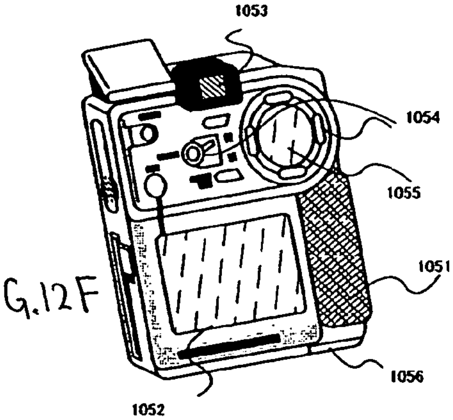

FIG. 12F shows a digital camera, which comprises a main body 1051, a display portion A 1052, an eye piece portion 1053, operation switches 1054, a display portion B 1055, a battery 1056, and the like. The present invention can be applied to a driver circuit of a display device having the display portions A 1052 and B 1055.

Figure 12G:
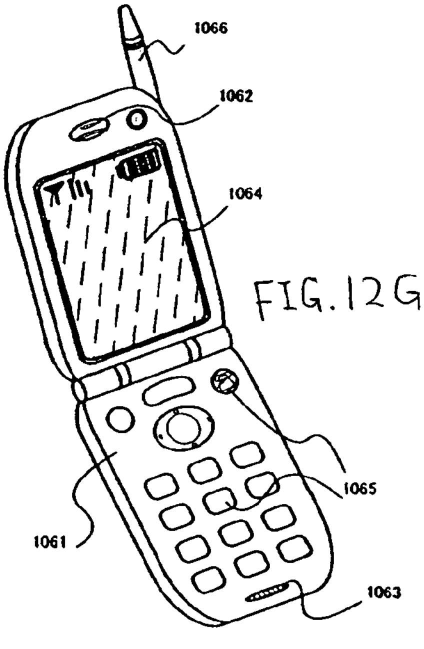

FIG. 12G shows a cellular phone, which comprises a main body 1061, an audio output section 1062, an audio input section 1063, a display portion 1064, operation switches 1065, an antenna 1066, and the like. The present invention can be applied to a driver circuit of a display device having the display portion 1064.

A heat resistant plastic substrate as well as a glass substrate can be used for a display device used for these electronic appliances. Accordingly, weight saving can further be achieved.

Note that the examples shown in this embodiment are just examples, and this embodiment is not limited thereto.

This embodiment can be carried out by freely being combined with Embodiment Mode and Embodiments 1 to 4.

In a display device using an OLED element, a frame frequency can be prevented from decreasing by efficiently switching from/to writing to a memory to/from reading from a memory with the use of a control circuit of the present invention.

What is claimed is:

1. A display device having a light-emitting element and expressing gray scale with a length of lighting time, comprising:

a control circuit comprising:
  first to fourth signals;
  first and second memories;
  a reading device; and
  a writing device,
wherein the first signal is a vertical synchronizing signal,
wherein the second signal is a horizontal synchronizing signal,
wherein the third signal selects roles of the first and the second memories from writing and reading according to timing provided from the first signal and switches the roles of the first and the second memories every start of a writing signal,
wherein the fourth signal is determined according to states of the writing signal and the second horizontal synchronizing signal,
wherein a state of the fourth signal is changed from a first stand-by state for reading to a readable state when the writing signal is in a writable state and the second horizontal synchronizing signal is inverted,
wherein the state of the fourth signal is changed from the readable state to a second stand-by state for reading when the writing signal is in a writable state and the third signal is inverted, and
wherein the reading device and the writing device are synchronized in the case where the first memory has a role of reading and the second memory has a role of writing or in the case where the first memory has a role of writing and the second memory has a role of reading.

2. A device according to claim 1, wherein the memories are implemented over a FPC.

3. A device according to claim 1, wherein the memories are implemented over a substrate.

4. An electronic device comprising the display device according to claim 1.

5. A device according to claim 1, wherein the reading device comprises an FPGA.

6. A device according to claim 1, wherein the reading device comprises an LSI.

7. A device according to claim 1, wherein the writing device comprises an FPGA.

8. A device according to claim 1, wherein the writing device comprises an LSI.

9. A device according to claim 1, wherein the reading device and the writing device are provided over a same substrate with the display device.

10. A device according to claim 1, wherein the display device is incorporated into one selected from the group consisting of a video camera, a personal computer, a portable information terminal, an audio reproducing device, a digital camera and a cellular phone.

* * * * *